United States Patent [19]

Kumar et al.

[11] Patent Number: 5,328,503
[45] Date of Patent: Jul. 12, 1994

[54] ADSORPTION PROCESS WITH MIXED REPRESSURIZATION AND PURGE/EQUALIZATION

[75] Inventors: Ravi Kumar, Allentown; Tarik Naheiri, Bath; Charles F. Watson, Orefield, all of Pa.

[73] Assignee: Air Products and Chemicals, Inc., Allentown, Pa.

[21] Appl. No.: 37,070

[22] Filed: Mar. 25, 1993

Related U.S. Application Data

[63] Continuation-in-part of Ser. No. 976,878, Nov. 16, 1992, abandoned.

[51] Int. Cl.$^5$ .............................................. B01D 53/04
[52] U.S. Cl. .................................... 95/101; 95/105; 95/130; 95/148
[58] Field of Search ............... 95/98, 100–105, 95/119, 122, 130, 139, 148

[56] References Cited

U.S. PATENT DOCUMENTS

| | | | |
|---|---|---|---|
| 3,430,418 | 3/1969 | Wagner | 55/25 |
| 3,636,679 | 1/1972 | Baha | 55/26 |
| 3,717,974 | 2/1973 | Baha | 55/58 |
| 3,738,087 | 6/1973 | McCombs | 55/58 |
| 3,957,463 | 5/1976 | Drissel et al. | 55/25 |
| 3,986,849 | 10/1976 | Fuderer et al. | 55/25 |
| 4,077,780 | 3/1978 | Doshi | 95/100 |
| 4,194,892 | 3/1980 | Jones et al. | 55/58 |
| 4,326,858 | 4/1982 | Benkmann | 55/26 |
| 4,329,158 | 5/1982 | Sircar | 55/26 |
| 4,406,675 | 9/1983 | Dangieri et al. | 55/26 |
| 4,431,432 | 2/1984 | Amitani et al. | 95/100 |
| 4,461,630 | 7/1984 | Cassidy et al. | 95/100 |
| 4,475,930 | 10/1984 | Asztalos | 95/98 |
| 4,519,813 | 5/1985 | Hagiwara et al. | 95/101 |
| 4,589,888 | 5/1986 | Hiscock et al. | 55/26 |
| 4,614,525 | 9/1986 | Reiss | 55/25 |
| 4,650,500 | 3/1987 | Patel | 95/100 |
| 4,650,501 | 3/1987 | Hiscock et al. | 55/26 |
| 4,684,377 | 8/1987 | Haruna et al. | 55/26 |
| 4,756,723 | 7/1988 | Sircai | 55/25 |
| 4,761,165 | 8/1988 | Stöcker et al. | 95/98 X |
| 4,781,735 | 11/1988 | Tagawa et al. | 55/26 |
| 4,834,780 | 5/1989 | Benkmann | 95/139 |
| 4,917,710 | 4/1990 | Haruna et al. | 55/26 |
| 4,948,391 | 8/1990 | Noguchi | 55/26 |
| 4,969,935 | 11/1990 | Hay | 55/26 |
| 4,981,499 | 1/1991 | Hay et al. | 55/26 |
| 5,015,271 | 5/1991 | Reiss | 55/25 |

FOREIGN PATENT DOCUMENTS

| | | |
|---|---|---|
| 0273723 | 7/1988 | European Pat. Off. |
| 0354259 | 2/1990 | European Pat. Off. |
| 0449448 | 10/1992 | European Pat. Off. |
| WO91/12874 | 9/1991 | France |
| 59-35141 | 9/1985 | Japan |
| 59-255060 | 6/1986 | Japan |
| 1559325 | 1/1980 | United Kingdom |
| 1594454 | 7/1981 | United Kingdom |
| 2109266 | 6/1983 | United Kingdom |
| 2154895 | 9/1985 | United Kingdom |
| 2227685 | 8/1990 | United Kingdom |

*Primary Examiner*—Robert Spitzer
*Attorney, Agent, or Firm*—Geoffrey L. Chase; James C. Simmons; William F. Marsh

[57] ABSTRACT

A process for separating a feed gas mixture into a more strongly adsorbable component and a less strongly adsorbable component in a plurality of adsorbent beds containing an adsorbent selective for the more strongly adsorbable component using pressure equalization between beds after initial depressurization to provide a purge gas and using a combination of less strongly adsorbable component and feed gas mixture to repressurize the adsorbent bed. Oxygen product can be recovered from air at high recovery using the process.

45 Claims, 1 Drawing Sheet

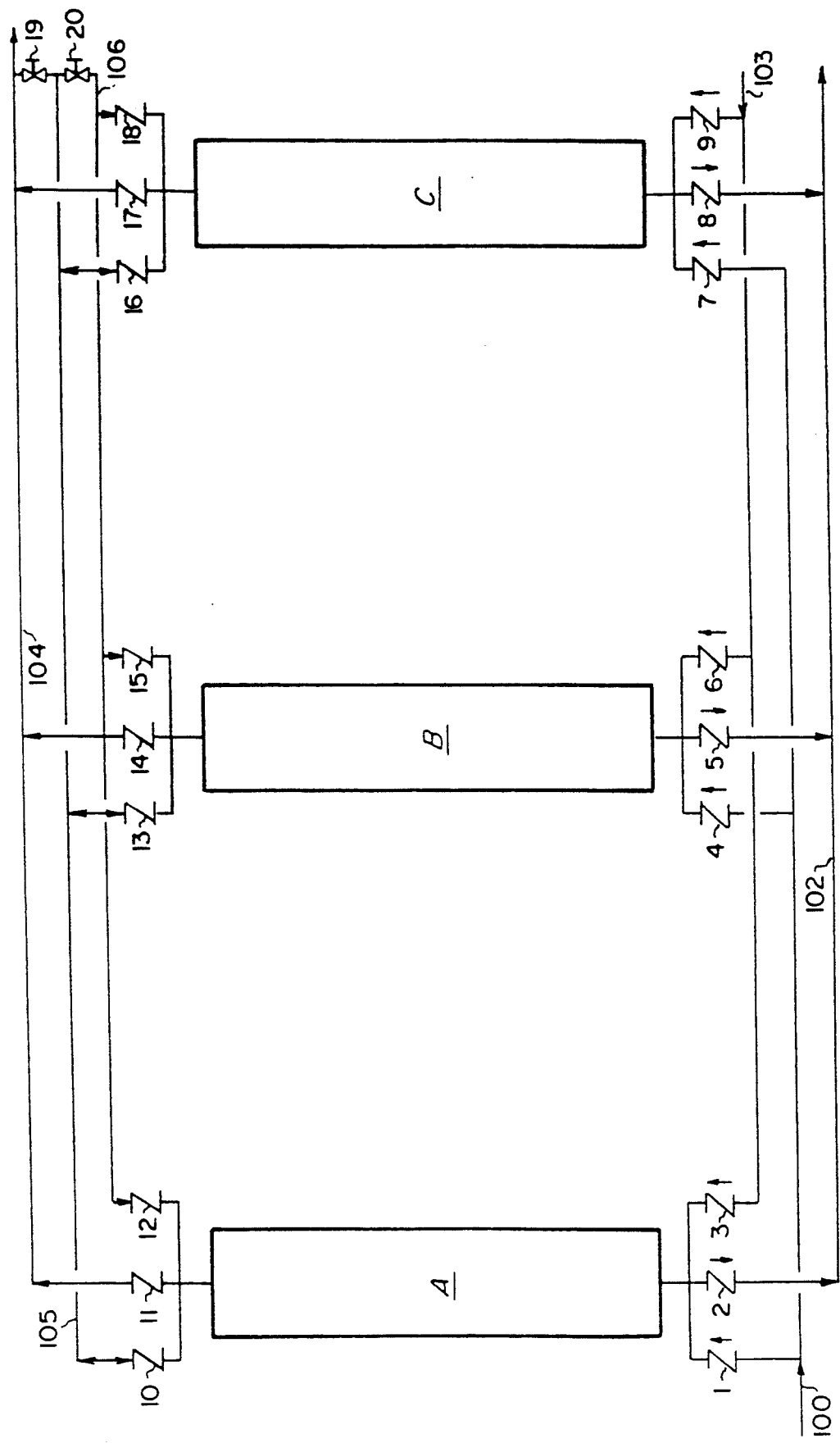

ADSORPTION PROCESS WITH MIXED REPRESSURIZATION AND PURGE/EQUALIZATION

This is a continuation-in-part of application Ser. No. 976,878 filed Nov. 16, 1992, now abandoned.

FIELD OF THE INVENTION

The present invention is directed to a pressure swing adsorption process for the separation of a more strongly adsorbable component from a less strongly adsorbable component in a gas mixture with high recovery of the less strongly adsorbable component at approximately feed pressure. More specifically, the present invention is a vacuum swing adsorption process for the separation of air to recover oxygen as a relatively unadsorbed product at high recovery and approximately feed pressure using cocurrent depressurization to provide purge gas followed by pressure equalization and mixed repressurization.

BACKGROUND OF THE PRIOR ART

Oxygen is a commodity chemical in the industrial gas industry. It has numerous applications including waste water treatment, glass melting furnaces, and the steel industry. One of the most common methods of oxygen production is by cryogenic distillation of air. However, this technology is not competitive for small size oxygen plants (<100 TPD $O_2$). The technology of choice for this size range is adsorption. There is a need in the marketplace to produce oxygen at low capital and energy costs by adsorptive gas separation.

Adsorptive processes are extensively used in the industry to produce oxygen from air for small size oxygen plants (<100 TPD $O_2$). There are two major categories of these processes—pressure swing adsorption processes (PSA) and vacuum swing adsorption processes (VSA). The pressure swing adsorption processes carry out the adsorption (feed) step at pressures much higher than ambient and adsorbent regeneration at pressures close to ambient. The adsorbent beds go through secondary process steps, such as pressure equalizations, depressurizations, blowdowns, and purge or various combinations of these during the cycle. Some of the $O_2$-PSA processes are described in U.S. Pat. Nos. 3,430,418; 3,636,679; 3,717,974; 3,738,087; 4,326,858; 4,329,158; 4,589,888; 4,650,501; 4,948,391; 4,969,935; 4,981,499; and U.K. Patent GB 2,227,685A.

These processes tend to be energy intensive and more suitable for smaller oxygen plants producing less than 40 tons of oxygen per day and preferably less than 20 tons of oxygen per day. A subset of $O_2$ PSA processes is a rapid pressure swing adsorption (RPSA) process. As the name implies, this process involves similar steps as a PSA process, but carries out these steps very quickly. Some examples of this process are U.S. Pat. Nos. 4,194,892 and 4,406,675. Again, this process tends to be energy intensive and suitable for oxygen plants even smaller than $O_2$ PSA's.

Primary reasons for high energy consumption in PSA processes are: (1) $O_2$ recovery from these processes is low, and (2) the entire feed stream has to be compressed up to the adsorption pressure. These inefficiencies are somewhat circumvented in vacuum swing adsorption (VSA) processes. In these processes, adsorption is carried out at pressure close to ambient and adsorbent regeneration is carried out at sub-atmospheric levels. The adsorbent beds go through several secondary steps with the primary aim of increasing oxygen recovery and reducing adsorbent inventory per unit of product gas.

U.S. Pat. No. 3,957,463 describes an $O_2$ VSA process comprised of the steps of: adsorption, evacuation and product repressurization. The process consists of two trains of two adsorbent beds in each train. The beds on the feed end of each train remove water and carbon dioxide from air, and the beds on the product end of each train remove nitrogen from air. Oxygen produced from the process is stored for later use as product and repressurization gas in a tank.

GB Patent 1,559,325 describes several two and three bed $O_2$ VSA processes. The two bed $O_2$ VSA processes have the steps: adsorption, evacuation, and product repressurization with the addition of purging the bed during evacuation and repressurizing it after evacuation with gas being continuously produced by the bed on adsorption step. The three bed options have similar steps with the addition that all the effluent gas from a bed toward the end of its adsorption step is fed to the bed which has finished product repressurization and is ready to go on to the air feed step. Effluent from the second bed is also withdrawn as oxygen product. A vacuum pump operates continuously in the three bed options, and the product take off is also continuous. GB Patent 1,594,454 describes the control strategy for $O_2$ VSA process disclosed in GB Patent 1,559,325.

Japanese patent application 59-255060 (255,060/84) describes a four bed $O_2$ VSA process with the process steps: adsorption, cocurrent depressurization, evacuation, vacuum purge, pressure equalization, and product repressurization. In this process, the gas obtained during the cocurrent depressurization step is used for the pressure equalization steps and then vacuum purge.

U.K. Patent application GB 2,154,895A describes three bed $O_2$ VSA processes with process steps: adsorption, cocurrent depressurization, evacuation, vacuum purge, pressure equalization(s), and simultaneous feed repressurization with product end to product end pressure equalization. The cocurrent depressurized gas is used for pressure equalization(s) and vacuum purge.

Japanese patent application 1984-[Showa 59]-35,141 describes a three bed $O_2$ VSA process with these steps: adsorption, evacuation with continuous purge, and repressurization. In this process, vacuum purge and repressurization are carried out by product oxygen.

U.K. Patent GB 2,109,266B describes three and four bed $O_2$ VSA processes comprised of steps: adsorption, provide purge gas, evacuation, vacuum purge, and product repressurization steps. The purge gas used for vacuum purge step is provided either by cocurrent depressurization of the bed, which has finished its adsorption step, or by continuing the feed to the bed on its adsorption step but directing all the effluent from this bed to the bed on a vacuum purge step.

U.S. Pat. No. 3,986,849 describes a hydrogen PSA process using two to three pressure equalization steps prior to depressurization to provide purge in a process having multiple beds on overlapping adsorption steps.

U.S. Pat. No. 4,614,525 suggests an improvement to $O_2$ VSA processes by heating the feed mixture by heat exchange with the vacuum pump.

U.S. Pat. No. 4,684,377 outlines a three bed $O_2$ VSA process with steps: adsorption, simultaneous cocurrent depressurization and evacuation, evacuation, product end to product end pressure equalization by gas from the product end of the bed on simultaneous cocurrent depressurization, and evacuation step and product repressurization.

U.S. Pat. No. 4,756,723 describes an adsorptive process for oxygen production where adsorption is carried out at superambient pressure. This is followed by countercurrent depressurization, evacuation and product repressurization to adsorption pressure. Part of the gas discharged during the countercurrent depressurization step may also be used for pressure equalization with a bed before the product repressurization step.

U.S. Pat. No. 4,917,710 describes a two bed $O_2$ VSA process with a product storage vessel. Process cycle steps are: adsorption, cocurrent depressurization, simultaneous cocurrent depressurization and evacuation, evacuation, vacuum purge by product, vacuum purge by gas obtained in a cocurrent depressurization step, simultaneous pressure equalization and product repressurization, and simultaneous feed and product repressurization. Gas for product repressurization and product purge is obtained from the product storage vessel. Gas for pressure equalization is obtained from the bed on simultaneous cocurrent depressurization and evacuation step.

U.S. Pat. No. 4,781,735 and European patent application 0 273 723 describe a three bed $O_2$ VSA process with steps: adsorption, feed to feed or dual end pressure equalization, cocurrent depressurization, evacuation, vacuum purge by gas obtained in cocurrent depressurization step, product repressurization from bed on feed step, simultaneous feed repressurization and feed to feed or dual end pressure equalization.

European patent application 0 354 259 outlines various options for a two bed $O_2$ VSA process: adsorption, cocurrent depressurization, evacuation, pressure equalization with gas obtained in cocurrent depressurization step and feed repressurization. Some options include vacuum purge by product gas from the bed on adsorption step.

U.S. Pat. No. 4,969,935 describes a three bed $O_2$ VSA process with steps: adsorption, simultaneous cocurrent depressurization and countercurrent evacuation, countercurrent evacuation, vacuum purge by product, product end to product end pressure equalization followed by product end to feed end pressure equalization using cocurrently depressurized gas and product repressurization.

U.S. Pat. No. 5,015,271 describes an $O_2$ VSA process with the steps: adsorption, simultaneous cocurrent depressurization and countercurrent evacuation or feed, countercurrent evacuation, simultaneous product to product pressure equalization and feed repressurization, or vacuum purge, simultaneous feed and product repressurization and feed repressurization.

French Patent WO91/12874; PCT/FR91/00164 describes a two bed $O_2$ VSA process with basic process steps of adsorption, depressurization, evacuation, vacuum purge by product, pressure equalization and repressurization. Three variations are outlined.

European Patent 0 449 448 A1 outlines a two bed process with steps: adsorption, simultaneous evacuation and cocurrent depressurization, evacuation, product purge under vacuum, pressure equalization and product repressurization.

Despite the prior art, a need still exists for an $O_2$ VSA process with higher oxygen recovery (i.e. lower energy costs) and lower adsorbent requirement per unit of oxygen production (i.e. lower capital costs) than the current processes. The present invention outlines a three bed vacuum swing adsorption (VSA) process to produce oxygen from air at higher oxygen recovery and lower adsorbent requirement per unit of oxygen product than current $O_2$ VSA processes.

BRIEF SUMMARY OF THE INVENTION

The present invention is a process for selectively separating a more strongly adsorbable component from a less strongly adsorbable component of a feed gas mixture in a plurality of adsorption beds containing an adsorbent selective for the more strongly adsorbable component, comprising the steps of:

(a) introducing a feed gas mixture at high pressure containing the more strongly adsorbable component and the less strongly adsorbable component into an inlet of a first adsorption bed containing the adsorbent selective for the more strongly adsorbable component and adsorbing the more strongly adsorbable component on the adsorbent while the less strongly adsorbable component passes through the first bed unadsorbed until the adsorption front of the more strongly adsorbable component approaches an outlet of the first bed and terminating the introduction of the feed gas mixture;

(b) following the termination of the introduction of the feed gas mixture into the first bed and without any intervening steps, cocurrently depressurizing the first bed to a lower pressure to remove the gas mixture from the first bed and passing the gas mixture to an outlet of another bed of the plurality of adsorption beds at lower pressure to countercurrently purge the more strongly adsorbable component from the other bed;

(c) countercurrently evacuating the first bed under vacuum conditions to further remove the more strongly adsorbable component at the lowest pressure;

(d) countercurrently purging the first bed with cocurrently depressurizing gas mixture from another bed of the plurality of adsorption beds undergoing step (b) to remove additional more strongly adsorbable component from the first bed;

(e) repressurizing the first bed with less strongly adsorbable component from another bed of the plurality of adsorption beds currently undergoing step (a) and with feed gas mixture; and (f) performing steps (a) through (e) in each of the plurality of adsorption beds in a phased sequence.

Preferably, the bed is repressurized initially with feed gas mixture and then with said less strongly adsorbable component.

Preferably, the bed is repressurized with ambient pressure feed gas mixture and high pressure feed gas mixture.

Preferably, the bed is repressurized with ambient pressure feed gas mixture and then with the less strongly adsorbable component.

Preferably, the bed is repressurized initially with ambient pressure feed gas mixture, then with high pressure feed gas mixture and finally with less strongly adsorbable component.

Most preferably, the bed is repressurized initially with less strongly adsorbable component and then with feed gas mixture.

Preferably, the bed is repressurized initially with said less strongly adsorbable component then with ambient pressure feed gas mixture.

Preferably, the bed is repressurized initially with said less strongly adsorbable component then with ambient pressure feed gas mixture and then with high pressure feed gas mixture.

Further alternatively, the bed is repressurized with less strongly adsorbable component and feed gas mixture simultaneously.

Further alternatively, the bed is repressurized with less strongly adsorbable component and ambient pressure feed gas mixture simultaneously.

Alternatively, the process is carried out in at least four beds and at least two beds are simultaneously in a portion of step(a).

Further alternatively, the bed is repressurized with less strongly adsorbable component and high pressure feed gas mixture simultaneously.

Preferably, the feed gas mixture is air, the more strongly adsorbable component is nitrogen and the less strongly adsorbable component is oxygen.

Preferably, a bed finishing cocurrent depressurization is then further cocurrently depressurized to pressure equalize with another bed of the plurality of adsorption beds finishing countercurrent purge.

The present invention is also a process for selectively separating a more strongly adsorbable component from a less strongly adsorbable component of a feed gas mixture in a plurality of adsorption beds containing an adsorbent selective for the more strongly adsorbable component, comprising the steps of:

(a) introducing a feed gas mixture at high pressure containing the more strongly adsorbable component and the less strongly adsorbable component into an inlet of a first adsorption bed containing an adsorbent selective for the more strongly adsorbable component and adsorbing the more strongly adsorbable component on the adsorbent while the less strongly adsorbable component passes through the first bed unadsorbed until the adsorption front of the more strongly adsorbable component approaches an outlet of the first bed and terminating the introduction of the feed gas mixture;

(b) following the termination of the introduction of the feed gas mixture into the first bed and without any the intervening steps, cocurrently depressurizing the first bed to a lower pressure to remove the gas mixture from the first bed and passing the gas mixture to an outlet of a second bed of the plurality of adsorption beds at lower pressure to countercurrently purge the more strongly adsorbable component from the second bed;

(c) cocurrently depressurizing the first bed to further remove the gas mixture from the first bed and to pressure equalize the first bed with another bed of the plurality of adsorption beds finishing countercurrent purge of step (e);

(d) countercurrently evacuating the first bed under vacuum conditions to further remove the more strongly adsorbable component at a lowest pressure;

(e) countercurrently purging the first bed with cocurrently depressurizing gas mixture from another bed of the plurality of adsorption beds undergoing step (b) to remove additional more strongly adsorbable component from the first bed;

(f) countercurrently pressure equalizing the first bed with another bed of the plurality of adsorption beds at higher pressure undergoing the cocurrent depressurization of step (c);

(g) repressurizing the first bed with less strongly adsorbable component from another bed of the plurality of adsorption beds currently undergoing step (a) and with feed gas mixture at the high pressure; and (h) performing steps (a) through (g) in each of the plurality of adsorption beds in a phased sequence.

Alternatively, during step (c) cocurrent depressurization to pressure equalize with another bed, simultaneously initiating countercurrent evacuation of said first bed.

Further alternatively, the process is carried out in two beds.

The present invention is further the process for selectively separating nitrogen from oxygen in air in three adsorption beds containing an adsorbent selective for nitrogen, comprising the steps of:

(a) introducing feed air at high pressure into an inlet of a first adsorption bed containing an adsorbent selective for nitrogen and adsorbing nitrogen on the adsorbent while oxygen passes through the first bed unadsorbed as a product until the adsorption front of nitrogen approaches an outlet of the first bed and terminating the introduction of air into the first bed;

(b) following the termination of the introduction of air into the first bed and without any intervening steps, cocurrently depressurizing the first bed to remove void space gas and nitrogen from the first bed and passing the void space gas and nitrogen to an outlet of another bed of the three adsorption beds at lower pressure to countercurrently purge the nitrogen from the other bed;

(c) cocurrently depressurizing the first bed to further remove the void space gas and nitrogen from the first bed and to pressure equalize the first bed with another bed of the three adsorption beds finishing the countercurrent purge of step (e);

(d) countercurrently evacuating the first bed under vacuum conditions to further remove the void space gas and nitrogen at a lowest pressure;

(e) countercurrently purging the first bed with cocurrently depressurizing void space gas and nitrogen from another bed of the three adsorption beds undergoing step (b) to remove additional nitrogen from the first bed;

(f) countercurrently pressure equalizing the first bed with another bed of the three adsorption beds at higher pressure undergoing the cocurrent depressurization of step (c);

(g) repressurizing the first bed with oxygen from another bed of the three adsorption beds currently undergoing step (a) and with feed air at the high pressure; and (h) performing steps (a) through (g) in each of the three adsorption beds in a phased sequence.

Preferably, the feed air is at a pressure in the range of approximately 14–30 psia.

More preferably, the feed air is at a pressure in the range of approximately 14–24 psia.

Alternatively, during step (c) cocurrent depressurization to pressure equalize with another bed, simultaneously initiating countercurrent evacuation of said first bed.

Further alternatively, the process is carried out in two beds.

BRIEF DESCRIPTION OF THE DRAWING

The drawing is a schematic drawing of a preferred embodiment of the present invention using three parallel adsorption beds and appropriate valve manifolding for feed, evacuation, purge, equalization and repressurization.

DETAILED DESCRIPTION OF THE INVENTION

The present invention will now be described with regard to several preferred embodiments with the initial embodiment excluding pressure equalization and the second embodiment including pressure equalization.

The first embodiment has the following steps:
1. Adsorption (A),
2. Cocurrent depressurization (DP),
3. Countercurrent evacuation (DES),
4. Countercurrent purge (PU),
5. Sequential product (PRP) and feed repressurization, or sequential feed and product repressurization, or simultaneous product and feed repressurization. Feed repressurization can be further divided into two parts, the first being carried out by ambient air (AARP) and the second by high pressure feed (Feed RP)(15-30 psia).

A process cycle chart for this option with simultaneous repressurization is outlined in Table 1.

TABLE 1

Three Bed $O_2$ VSA

| Bed # | | | | | | |
|---|---|---|---|---|---|---|
| A | A | DP | DES | PU | PRP (AARP \| FEED RP) | |
| B | PU (AARP \| FEED RP) | PRP | A | DP | DES | |
| C | DP | DES | PU | PRP (AARP \| FEED RP) | A | |

A       - Adsorption (Feed)
DP      - Cocurrent depressurization
DES     - Countercurrent Evacuation
PU      - Countercurrent Vacuum Purge
PRP     - Product Repressurization
AARP    - Ambient Air Repressurization
Feed RP - High Pressure Feed Repressurization Process steps for the first embodiment will now be described in detail:

1. Adsorption (A), which consists of:
   a. Flowing the feed gas stream, consisting of atmospheric air at a pressure of 14.5-30 psia and a temperature of ~0°-150° F. through a bed packed with one or more adsorbents capable of selectively adsorbing water, carbon dioxide, and nitrogen from air.
   b. Withdrawing an effluent stream consisting of $O_2$ product at feed pressure. Part of this stream is immediately used as repressurization gas for bed on step 5 and the remainder constitutes oxygen product.
   c. Continuing steps 1(a) and 1(b) for a predetermined cycle time or until the concentration of nitrogen impurity in the effluent stream reaches a preset limit. The bed is now called "spent" because it has exhausted its capacity for removing nitrogen from feed gas.

2. Cocurrent Depressurization Step (DP), which consists of:
   a. Discontinuing the feed flow through the spent bed and transferring the feed to another VSA bed.
   b. Reducing the pressure in the spent VSA bed from the adsorption pressure level to some "intermediate" level (7.7-21 psia) by connecting the product end of this bed with the product end of the VSA bed on step 4 of its cycle.
   c. Discontinuing the above step when the pressure in the spent VSA bed has reached the predetermined intermediate pressure level. Preferably, the intermediate pressure is close to, but not lower than, the average of feed and lowest evacuation pressure reached in the VSA bed at the end of step 3 of its cycle.

3. Countercurrent Evacuation Step (DES), which consists of:
   a. Further reducing the pressure in the spent bed from intermediate level to the "lowest" level (1.0-10 psia) by connecting the feed or the feed and the product ends of the spent VSA bed with a vacuum pump.
   b. Continuing the above step until the pressure in the VSA bed has reached the predetermined lowest pressure level.

4. Countercurrent Purge Step (PU), which consists of:
   a. Continue evacuation of the VSA bed from the feed end.
   b. Connect the product end of this bed with another VSA bed on step 2 of its cycle.
   c. Continuing the above steps until pressure in this bed has reached to a "low" level (1.2-20 psia) and pressure in the VSA bed on step 2 has reached the intermediate pressure level.

5. Repressurization Step, which consists of:
   a. Discontinuing evacuation of the above bed and start evacuating another VSA bed. This bed is now called "regenerated" since its capacity for $N_2$, $H_2O$, and $CO_2$ removal from air has been restored.
   A. Simultaneous Product and Ambient Air and/or Feed Repressurization Step (PRP/AARP and/or FRP), which consists of:
      b. Connecting the product end of the regenerated bed with the product end of the bed on step 1 of its cycle and opening the feed end of the regenerated bed to ambient air or connecting the feed end of the regenerated bed to feed blower; or Connecting the product end of the regenerated bed with the product end of the bed on step 1 of its cycle and opening the feed end of the regenerated bed to ambient air.
      $b_1$ Continuing the above step until pressure in the regenerated bed is close to or equal to ambient pressure.
      $b_2$ Disconnecting the feed end of the regenerated bed from ambient air and connecting it to feed blower.

C. Continuing the above step until pressure in the regenerated bed is equal to the predetermined adsorption pressure.

OR

B. Sequential Product and Ambient Air and/or Feed Repressurization Step (PRP/AARP and/or FRP), which consists of:

b. Connecting the product end of the regenerated bed with the product end of the bed on step 1 of its cycle.

c. Continuing the above step until pressure in the regenerated bed has reached the predetermined pressure level, which is lower than the adsorption pressure.

d. Discontinuing the product repressurization and opening the feed end of the regenerated bed to ambient air or connecting it to the feed blower; or Discontinuing the product repressurization and opening the feed end of the regenerated bed to ambient air.

$d_1$ Continuing the above step until pressure in the regenerated bed is close to or equal to ambient pressure.

$d_2$ Disconnecting the feed end of the regenerated bed from ambient air and connecting it to the feed blower.

e. Continuing the above step until the pressure in the regenerated bed is equal to the predetermined adsorption pressure.

OR

C. Sequential Ambient air and/or Feed and Product Repressurization, which consists of:

b. Connecting the feed end of the regenerated bed to ambient air or connecting it to the feed blower; or Opening the feed end of the regenerated bed to ambient air.

$b_1$ Continuing the above step until pressure in the regenerated bed is close to or equal to ambient pressure.

$b_2$ Disconnecting the feed end of the regenerated bed from ambient air and connecting it to the feed blower.

c. Continuing the above ambient air and/or feed repressurization step until pressure in the regenerated bed has reached the predetermined pressure level, which is lower than the adsorption pressure.

d. Discontinuing the ambient air and/or feed repressurization step and connecting the product end of the regenerated bed with the product end of the bed on step 1 of its cycle.

e. Continuing the above step until the pressure in the regenerated bed is equal to the predetermined adsorption pressure.

This bed is now ready to undergo a new cycle starting from step 1(a).

The second embodiment has the following steps:
1. Adsorption (A),
2. Cocurrent depressurization to provide purge gas (DP1),
3. Cocurrent depressurization to provide pressure equalization gas (DP2) and optionally simultaneous initiation of countercurrent evacuation,
4. Countercurrent evacuation (DES),
5. Countercurrent purge (PU),
6. Pressure equalization (PE).
7. Product repressurization (PRP), or sequential product (PRP) and feed repressurization, or sequential feed and product repressurization, or simultaneous product and feed repressurization. Feed repressurization can be further divided into two parts, the first being carried out by ambient air (AARP) and the second by high pressure feed (Feed RP).

A process cycle chart for this option with product repressurization is outlined in Table 2.

TABLE 2

Three Bed $O_2$ VSA

| Bed # | | | | | | | |
|---|---|---|---|---|---|---|---|
| A | A | | DP1 | DP2 | DES | PU | PE | PRP |
| B | PU | PE | PRP | A | | DP1 | DP2 | DES |
| C | DP1 | DP2 | DES | PU | PE | PRP | A |

A — Adsorption (Feed)
DP1 — First Cocurrent Depressurization to Provide Purge
DP2 — Second Cocurrent Depressurization to Provide Pressure Equalization and Optionally Simultaneously Countercurrent Evacuation is Initiated
DES — Countercurrent Evacuation
PU — Countercurrent Vacuum Purge
PRP — Product Repressurization Process steps for the second embodiment will now be described in detail:

1. Adsorption Step (A), which consists of:

a. Flowing the feed gas stream, consisting of atmospheric air at a pressure of 14–30 psia and temperature of ~0°–150° F. through a bed packed with one or more adsorbents capable of selectively adsorbing water, carbon dioxide, and nitrogen from air.

b. Withdrawing an effluent stream consisting of $O_2$ product at feed pressure. Part of this stream is immediately used as repressurization gas for bed on step 7 and the remainder constitutes oxygen product.

c. Continuing steps 1(a) and 1(b) for a predetermined cycle time or until the concentration of nitrogen impurity in the effluent stream reaches a preset limit. The bed is now called "spent" because it has exhausted its capacity for removing nitrogen from feed gas.

2. Cocurrent Depressurization Step (DP1), which consists of:

a. Discontinuing the feed flow through the spent bed and transferring the feed to another VSA bed.

b. Reducing the pressure in the spent VSA bed from the adsorption pressure level to some "intermediate" level (11.5–25 psia) by connecting the product end of this bed with the product end of the VSA bed on step 5 of its cycle.

c. Discontinuing the above step when the pressure in the spent VSA bed has reached the predetermined intermediate pressure level.

3. Cocurrent Depressurization Step (DP2), which consists of:

a. Further reducing the pressure in the spent VSA bed from "intermediate level" to some "lower level" (7.7–21.3 psia) by connecting the product end of this bed with the product end of the VSA bed on step 6 of its cycle.

b. Discontinuing the above step when the pressure in the spent VSA bed has reached the predetermined "lower level". Preferably this pressure is the average of bed pressures at the end of steps 2 and 5.

c. Optionally, simultaneous to a above, initiating countercurrent evacuation of the spent VSA bed.

2. Countercurrent Evacuation Step (DES), which consists of:

a. Further reducing the pressure in the spent bed from lower level to the "lowest" level (1.0–10.0 psia) by connecting the feed or the feed and the product ends of the spent VSA bed with a vacuum pump.

b. Continuing the above step until the pressure in the VSA bed has reached the predetermined lowest pressure level.

Countercurrent Purge Step (PU), which consists of:

a. Continuing evacuation of the VSA bed from the feed end.

b. Connecting the product end of this bed with another VSA bed on step 2 of its cycle.

c. Continuing the above steps until pressure in this bed has reached a "low" level (1.2–20 psia) and pressure in the VSA bed on step 2 has reached to the intermediate pressure level.

6. Pressure Equalization Step (PE), which consists of:

a. Discontinuing evacuation of the above bed and start evacuating another VSA bed. This bed is now called "regenerated" since its capacity for $N_2$, $H_2O$, and $CO_2$ removal from air has been restored.

b. Connecting the product end of the regenerated bed with the product end of the bed on step 3 of its cycle.

c. Continuing the above step for a predetermined time or until pressure in bed has reached the predetermined lower level.

7. Repressurization Step, which consists of:

a. Discontinuing the pressure equalization of regenerated bed.

A. Product Repressurization (PRP), which consists of:

b. Connecting the product end of the pressure equalized regenerated bed with the product end of the bed on step 1 of its cycle.

c. Continuing the above step until pressure in the regenerated bed is close to or equal to the predetermined adsorption pressure.

OR

B. Simultaneous Product and Ambient Air and/or Feed Repressurization Step (PRP/AARP, and/or FRP), which consists of:

b. Connecting the product end of the regenerated bed with the product end of the bed on step 1 of its cycle and opening the feed end of the regenerated bed to ambient air or connecting the feed end of the regenerated bed to feed blower. or Connecting the product end of the regenerated bed with the product end of the bed on step 1 of its cycle and opening the feed end of the regenerated bed to ambient air.

b$_1$ Continuing the above step until pressure in the regenerated bed is close to or equal to ambient pressure.

b$_2$ Disconnecting the feed end of the regenerated bed from ambient air and connecting it to feed blower.

c. Continuing the above step until pressure in the regenerated bed is equal to the predetermined adsorption pressure.

OR

C. Sequential Product and Ambient Air and/or Feed Repressurization Step (PRP/AARP and/or FRP), which consists of:

b. Connecting the product end of the regenerated bed with the product end of the bed on step 1 of its cycle.

c. Continuing the above step until pressure in the pressure equalized regenerated bed has reached the predetermined pressure level, which is lower than the adsorption pressure.

d. Discontinuing the product repressurization and opening the feed end of the regenerated bed to ambient air or connecting it to the feed blower; or Discontinuing the product repressurization and opening the feed end of the regenerated bed to ambient air.

d$_1$ Continuing the above step until pressure in the regenerated pressure equalized bed is close to or equal to ambient pressure.

d$_2$ Disconnecting the feed end of the regenerated bed from ambient air and connecting it to the feed blower.

e. Continuing the above step until the pressure in the regenerated bed is equal to the predetermined adsorption pressure.

OR

D. Sequential Ambient Air and/or Feed and Product Repressurization, which consists of:

b. Connecting the feed end of the regenerated pressure equalized bed to ambient air or connecting it to the feed blower; or Opening the feed end of the regenerated bed to ambient air.

b$_1$ Continuing the above step until pressure in the regenerated bed is close to or equal to ambient pressure.

b$_2$ Disconnecting the feed end of the regenerated bed from ambient air and connecting it to the feed blower.

c. Continuing the above ambient air and/or feed repressurization step until pressure in the regeneration bed has reached the predetermined pressure level, which is lower than the adsorption pressure.

d. Discontinuing the ambient air and/or feed repressurization step and connecting the product end of the regenerated bed with the product end of the bed on step 1 of its cycle.

e. Continuing the above step until the pressure in the regenerated bed is equal to the predetermined adsorption pressure.

The bed is now ready to undergo a new cycle starting from step 1(a).

Flow schematic and hardware will be somewhat different for each of the process options of the present invention. The drawing depicts a schematic for the first preferred embodiment with simultaneous repressurization. Table 3 outlines the corresponding valve sequence for a typical cycle time. Detailed process description of the cycle at typical operating conditions for the process option described in the drawing and Tables 1 and 3 is given below:

Ambient air compressed to feed pressure (21 psia) by a feed blower enters through manifold 100 into first Bed A, which has been already pressurized to adsorption pressure via open valve 1. The Bed is packed with adsorbent(s) selective for the removal of water, carbon dioxide, and nitrogen from air. Oxygen products withdrawn via open valve 11 and manifold 104. Feed flow is switched to Bed B via open valve 4 after a predetermined time or as soon as nitrogen concentration in the effluent from Bed A reaches a preset limit or the adsorption front approaches the bed outlet. Pressure in Bed A is reduced by opening valve 10 and connecting Bed A with Bed C via manifold 105 and open valve 18. Bed C is being evacuated via open valve 8 and manifold 102. Valves 10, 18 and 8 are kept open for a predetermined time or until pressure in Bed A reaches 13.5 psia. Valve 10 is now closed and Bed A is evacuated via open valve 2 and manifold 102. Valves 12 and 13 are opened at the end of the feed step in Bed B and reaching of evacuation level pressure ~4 psia in Bed A. Valves 2, 12 and 13 are kept open for a predetermined time or until pressure in Bed A reaches 6 psia to vacuum purge Bed A through manifold 106. Valves 2 and 12 are then closed and valves 3 and 10 are opened for simultaneous ambient feed air and product repressurization through manifolds 103 and 105, respectively. Valve 3 is kept open until pressure in Bed A reaches ~13.5 psia. At this time, valve 3 is closed and valve 1 is opened. Bed A is now pressurized up to adsorption pressure ~21 psia with high pressure feed air in manifold 100. Valve 10 is then closed and valve 11 is opened to remove product oxygen through manifold 104. Bed A is now ready to start a new cycle. Each bed goes through a similar sequence of operation. Valve 19 is open during product repressurization. Valve 20 is open during purging.

Valve numbers refer to the drawing and the cycle is outlined in Table 2. Neither valve 19 or 20 are opened in this embodiment.

TABLE 4

| Valve # → | 1 | 2 | 3* | 4 | 5 | 6* | 7 | 8 | 9* | 10* | 11 | 12 | 13* | 14 | 15 | 16* | 17 | 18 |
|---|---|---|---|---|---|---|---|---|---|---|---|---|---|---|---|---|---|---|
| Time (sec) |  |  |  |  |  |  |  |  |  |  |  |  |  |  |  |  |  |  |
| 0–5 | o |  |  |  | o |  |  |  |  |  | o |  |  |  | o |  | o |  |
| 5–10 | o |  |  |  |  |  |  |  |  |  | o |  |  |  | o |  | o |  |
| 10–30 | o |  |  |  |  |  |  |  | o |  | o | o |  |  | o |  |  |  |
| 30–35 |  |  |  | o |  |  |  |  | o |  | o |  |  | o |  |  | o |  |
| 35–40 |  |  |  | o |  |  |  |  |  |  | o |  |  | o |  |  | o |  |
| 40–60 |  |  | o | o |  |  |  |  |  |  |  |  |  | o | o |  | o |  |
| 60–65 |  | o |  |  |  |  | o |  |  |  | o |  |  |  | o | o |  |  |
| 65–70 |  |  |  |  |  |  | o |  |  |  | o |  |  |  | o | o |  |  |
| 70–90 |  |  |  |  | o |  | o |  |  |  | o |  |  |  |  |  | o | o | o = open, otherwise closed
*These valves and corresponding headers are not used in this option.

EXAMPLE

Both preferred embodiments were tested in a process development unit (PDU) containing three, 8'×4" vessels. These vessels were packed with two types of adsorbents. Zeolite Na-X to remove water and carbon dioxide from ambient air was packed towards the feed end of these columns, and a $N_2/O_2$ selective Ca-A type zeolitic material was packed towards the product end of these vessels. Oxygen product purity of 93% was achieved.

Table 5 below compares the performance of the first preferred embodiment with a comparison process in which repressurization is carried out entirely by product oxygen. It is observed that the first preferred embodiment of the present invention requires less adsorbent per unit of oxygen product and results in higher oxygen recovery:

TABLE 5

|  | Prior Art (U.K. Patent GB 2,109,266B) | Present Invention (First Embodiment) |
|---|---|---|
| % $O_2$ Recovery | 53 | 63 |
| lb Adsorbent/lbmole $O_2$ Product | 1 | 0.84 |

Table 6 below compares the performance of the second preferred embodiment with a comparative process in which pressure equalization is not carried out. It is observed that the second preferred embodiment of the present invention requires more adsorbent per unit of oxygen product, but results in higher oxygen recovery:

TABLE 3

| Valve # → | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|---|---|---|---|---|---|---|---|
| Time (sec) |  |  |  |  |  |  |  |  |  |  |  |  |  |  |  |  |  |  |
| 0–10 | o |  |  |  | o |  |  |  | o |  |  |  |  | o | o |  |  |  |
| 10–20 | o |  |  |  |  | o | o |  | o | o |  |  |  |  |  |  |  |  |
| 20–30 | o |  | o |  |  |  | o |  | o | o |  |  |  |  |  |  |  |  |
| 30–40 |  |  | o |  |  |  | o | o |  |  |  | o |  |  |  |  |  | o |
| 40–50 |  | o | o |  |  |  |  | o |  |  |  | o | o |  |  |  |  |  |
| 50–60 |  | o | o |  | o |  |  |  |  |  |  | o | o |  |  |  |  |  |
| 60–70 |  | o |  |  | o |  |  |  |  | o | o |  |  |  | o |  |  |  |
| 70–80 |  |  | o |  | o | o |  | o |  |  |  |  |  |  | o |  |  |  |
| 80–90 | o |  |  |  | o | o |  | o |  |  |  |  |  |  | o |  |  |  | o = open, otherwise closed

Table 4 outlines valve sequence for the second preferred embodiment with product repressurization.

TABLE 6

|  | Prior Art (U.K. Patent GB 2,109,266B) | Present Invention (Second Embodiment) |
| --- | --- | --- |
| % O₂ Recovery | 57 | 62 |
| lb Adsorbent/lbmole O₂ Product | 1 | 1.06 |

It should be appreciated that exact operating conditions and adsorbents for the first and second preferred embodiment of the present are somewhat different.

It is also possible to perform the first (Table 7) and second (Table 8) embodiments in a 2-bed format with each bed experiencing the same series of cycle steps. The inter-relationship of the steps occurring in each bed does change, as set forth below, and cocurrent depressurization to pressure equalize while simultaneously countercurrently venting is still an option in the second embodiment.

TABLE 7

Two Bed $O_2$ VSA

| Bed # | | | | | | |
| --- | --- | --- | --- | --- | --- | --- |
| A | \| A \| DP1 \| DES \| PU \| RP \| |
| B | \| DES \| PU \| RP \| A \| DP1 \| DES \| |

A   - Adsorption (Feed)
DP1 - First Cocurrent Depressurization to Provide Purge
DES - Countercurrent Evacuation
PU  - Countercurrent Vacuum Purge
RP  - Repressurize Under One of Plurality of Options Set Forth for Other Embodiments

TABLE 8

Two Bed $O_2$ VSA

| Bed # | | | | | | | |
| --- | --- | --- | --- | --- | --- | --- | --- |
| A | \| A \| DP1 \| DP2 \| DES \| PU \| PE \| RP \| |
| B | \| DES \| PU \| PE \| RP \| A \| DP1 \| DP2 \| DES \| |

A   - Adsorption (Feed)
DP1 - First Cocurrent Depressurization to Provide Purge
DP2 - Second Cocurrent Depressurization to Provide Pressure Equalization and Optionally Simultaneously Initiation of Countercurrent Evacuation
DES - Countercurrent Evacuation
PU  - Countercurrent Vacuum Purge
RP  - Repressurize Under One of Plurality of Options Set Forth for Other Embodiments It is further possible to perform the first or second embodiment in a format having at least four beds wherein at least two beds are on feed or adsorption per recited step (a). An examplary cycle is set forth in Table 9, below.

TABLE 9

Four Bed $O_2$ VSA

| Bed # | | | | | | |
| --- | --- | --- | --- | --- | --- | --- |
| A | \| A \| DP \| EVAC \| PU \| RP \| |
| B | \| PU \| RP \| A \| DP \| EVAC \| |

TABLE 9-continued

| | | | | | |
| --- | --- | --- | --- | --- | --- |
| C | \| DP \| EVAC \| PU \| RP \| A \| |
| D | \| A \| DP \| EVAC \| PU \| RP \| A \| |

A    - Adsorption (Feed)
DP1  - First Cocurrent Depressurization to Provide Purge
EVAC - Countercurrent Evacuation
PU   - Countercurrent Vacuum Purge
RP   - Repressurize Under One of Plurality of Options Set Forth for Other Embodiments The embodiment with multi pl e beds on feed can be carried out with a pressure equalization step following the purge step wherein equalization gas is supplied from a bed then undergoing cocurrent depressurization. Cocurrent depressurization with simultaneous countercurrent evacuation is also possible. Using five or six beds, it is possible to have three beds simultaneously undergoing some portion of the step (a) feed or adsorption step.

Any adsorbent(s) which can selectively remove water, carbon dioxide, and nitrogen from air can be used. Examples of adsorbents capable of removing nitrogen from air include zeolitic molecular sieves such as NaX, NaA, CaX, CaA and other adsorbents with binary cations. Examples of adsorbents capable of removing water and carbon dioxide from air are aluminas, silica gels and zeolites. Other desired properties of the adsorbents are (i) high crush strength, (ii) high attrition resistance, (iii) large bulk density, (iv) low interpartical void, (v) high heat capacity, (vi) large thermal conductivity, (vii) high $N_2/O_2$ selectivity, (viii) low oxygen capacity and (ix) small particle size. Pressure drop through the adsorbent beds during adsorption and evacuation steps is also important for adsorbent selection.

Experiments with three bed $O_2$ VSA cycles show that the order of magnitude of total product from a bed on adsorption step is about ten times the net oxygen product. The remainder of the total product gas not withdrawn as net product is required for product repressurization. Therefore, if one can reduce the quantity of product gas being used as the repressurization gas, the net product gas quantity will increase, improving the efficiency of the process.

One way the first embodiment achieves this is to use the feed gas for repressurization. However, total feed repressurization is not advisable since (1) it results in spreading of the $N_2$ front during the adsorption step and (2) water, carbon dioxide removal becomes less efficient. To eliminate these problems, partial feed and a partial product repressurization are employed. Another key of the present invention is realized by observing that the bed ready to be repressurized is at pressure lower than ambient; therefore, it can be repressurized by feed air by simply opening the inlet valve to atmosphere. This reduces blower power consumption otherwise used for feed repressurization. Repressurization only up to and adsorption at ambient pressure is not efficient for the operation of three bed $O_2$ VSA units. Therefore, ambient air repressurization is followed by feed air or product repressurization.

Another method to reduce the quantity of product gas required for repressurization is by the appropriate use of pressure equalization steps (second embodiment). However, the prior art teaches that one should first depressurize the high pressure bed for pressure equalization and then depressurize it for providing the purge gas. Unexpectedly, it has been determined that for this cycle the reverse, i.e., first depressurization to provide purge followed by second depressurization to pressure equalize, is more efficient.

The present invention has been set forth with regard to several illustrative preferred embodiments, but the full scope of the present invention should be ascertained from the claims below.

We claim:

1. A process for selectively separating a more strongly adsorbable component from a less strongly adsorbable component of a feed gas mixture in a plurality of adsorption beds containing an adsorbent selective for the more strongly adsorbable component, comprising the steps of:
   (a) introducing a feed gas mixture at high pressure containing said more strongly adsorbable component and said less strongly adsorbable component into an inlet of a first adsorption bed containing said adsorbent selectivel for the more strongly adsorbable component and adsorbing the more strongly adsorbable component on the adsorbent while the less strongly adsorbable component passes through said first bed unadsorbed until the adsorption front of the more strongly adsorbable component approaches an outlet of said first bed and terminating the introduction of the feed gas mixture;
   (b) following the termination of the introduction of the feed gas mixture into said first bed and without any intervening steps, cocurrently depressurizing said first bed to a lower pressure to remove said gas mixture from said first bed and passing said gas mixture to an outlet of a second bed of said plurality of adsorption beds at lower pressure to countercurrently purge said more strongly adsorbable component from said second bed;
   (c) countercurrently evacuating said first bed under vacuum conditions to further remove said more strongly adsorbable component at the lowest pressure;
   (d) countercurrently purging said first bed with cocurrently depressurizing gas mixture from a bed of said plurality of adsorption beds undergoing step (b) to remove additional more strongly adsorbable component from said first bed;
   (e) repressurizing said first bed with less strongly adsorbable component from a bed of said plurality of adsorption beds currently undergoing step (a) and with feed gas mixture; and
   (f) performing steps (a) through (e) in each of said plurality of adsorption beds in a phased sequence.

2. The process of claim 1 wherein a bed undergoing step (e) is repressurized initially with feed gas mixture and then with said less strongly adsorbable component.

3. The process of claim 1 wherein a bed undergoing step (e) is repressurized with ambient pressure feed gas mixture and high pressure feed gas mixture.

4. The process of claim 3 wherein a bed undergoing step (e) is repressurized initially with ambient pressure feed gas mixture, then with high pressure feed gas mixture and finally with said less strongly adsorbable component.

5. The process of claim 1 wherein a bed undergoing step (e) is repressurized initially with ambient pressure feed gas mixture and then with said less strongly adsorbable component.

6. The process of claim 1 wherein a bed undergoing step (e) is repressurized initially with said less strongly adsorbable component and then with feed gas mixture.

7. The process of claim 1 wherein a bed undergoing step (e) is repressurized initially with said less strongly adsorbable component then with ambient pressure feed gas mixture.

8. The process of claim 1 wherein a bed undergoing step (e) is repressurized initially with said less strongly adsorbable component then with ambient pressure feed gas mixture and then with high pressure feed gas mixture.

9. The process of claim 1 wherein a bed undergoing step (e) is repressurized with said less strongly adsorbable component and said feed gas mixture simultaneously.

10. The process of claim 9 wherein a bed undergoing step (e) is repressurized with said less strongly adsorbable component and ambient pressure feed gas mixture simultaneously.

11. The process of claim 9 wherein a bed undergoing step (e) is repressurized with said less strongly adsorbable component and high pressure feed gas mixture simultaneously.

12. The process of claim 1 wherein said feed gas mixture is air, said more strongly adsorbable component is nitrogen and said less strongly adsorbable component is oxygen.

13. The process of claim 1 wherein a bed finishing cocurrent depressurization is then further cocurrent depressurized to pressure equalize with a bed of said plurality of adsorption beds finishing countercurrent purge.

14. The process of claim 1 wherein the process is carried out in two beds.

15. The process of claim 1 wherein the process is carried out in at least four beds and at least two beds are simultaneously in a portion of step (a).

16. A process for selectively separating a more strongly adsorbable component from a less strongly adsorbable component of a feed gas mixture in a plurality of adsorption beds containing an adsorbent selective for the more strongly adsorbable component, comprising the steps of:
   (a) introducing a feed gas mixture at high pressure containing said more strongly adsorbable component and said less strongly adsorbable component into an inlet of a first adsorption bed containing said adsorbent selective for the more strongly adsorbable component and adsorbing the more strongly adsorbable component on the adsorbent while the less strongly adsorbable component passes through said first bed unadsorbed until the adsorption front of the more strongly adsorbable component approaches an outlet of said first bed and terminating the introduction of the feed gas mixture;
   (b) following the termination of the introduction of the feed gas mixture into said first bed and without any intervening steps, cocurrently depressurizing said first bed to a lower pressure to remove said gas mixture from said first bed and passing said gas mixture to an outlet of a second bed of said plurality of adsorption beds at lower pressure to countercurrently purge said more strongly adsorbable component from said second bed;
   (c) cocurrently depressurizing said first bed to further remove said gas mixture from said first bed and to pressure equalize said first bed with a bed of said plurality of adsorption beds finishing countercurrent purge of step (e);

(d) countercurrently evacuating said first bed under vacuum conditions to further remove said more strongly adsorbable component at a lowest pressure;

(e) countercurrently purging said first bed with cocurrently depressurizing gas mixture from a bed of said plurality of adsorption beds undergoing step (b) to remove additional more strongly adsorbable component from said first bed;

(f) countercurrently pressure equalizing said first bed with a bed of said plurality of adsorption beds at higher pressure undergoing said cocurrent depressurization of step (c);

(g) repressurizing said first bed with less strongly adsorbable component from a bed of said plurality of adsorption beds currently undergoing step (a) and with feed gas mixture; and (h) performing steps (a) through (g) in each of said plurality of adsorption beds in a phased sequence.

17. The process of claim 16 wherein a bed undergoing step (g) is repressurized initially with feed gas mixture and then with said less strongly adsorbable component.

18. The process of claim 16 wherein a bed undergoing step (g) is repressurized with ambient pressure feed gas mixture and high pressure feed gas mixture.

19. The process of claim 16 wherein a bed undergoing step (g) is repressurized initially with ambient pressure feed gas mixture and then with said less strongly adsorbable component.

20. The process of claim 16 wherein a bed undergoing step (g) is repressurized initially with ambient pressure feed gas mixture, then with high pressure feed gas mixture and finally with said less strongly adsorbable component.

21. The process of claim 16 wherein a bed undergoing step (g) is repressurized initially with said less strongly adsorbable component and then with feed gas mixture.

22. The process of claim 16 wherein a bed undergoing step (g) is repressurized initially with said less strongly adsorbable component then with ambient pressure feed gas mixture.

23. The process of claim 16 wherein a bed undergoing step (g) is repressurized initially with said less strongly adsorbable component then with ambient pressure feed gas mixture and then with high pressure feed gas mixture.

24. The process of claim 16 wherein a bed undergoing step (g) is repressurized with said less strongly adsorbable component and said feed gas mixture simultaneously.

25. The process of claim 16 wherein said feed gas mixture is air, said more strongly adsorbable component is nitrogen and said less strongly adsorbable component is oxygen.

26. The process of claim 16 wherein during step (c) cocurrent depressurization to pressure equalize with a bed undergoing step (f), simultaneously initiating countercurrent evacuation of said first bed.

27. The process of claim 16 wherein the process is carried out in two beds.

28. The process of claim 16 wherein the process is carried out in at least four beds and at least two beds are simultaneously in a portion of step (a).

29. A process for selectively separating nitrogen from oxygen in air in three adsorption beds containing an adsorbent selective for nitrogen, comprising the steps of:

(a) introducing feed air at high pressure into an inlet of a first adsorption bed containing said adsorbent selective for nitrogen and adsorbing nitrogen on the adsorbent while oxygen passes through said first bed unadsorbed as a product until the adsorption front of nitrogen approaches an outlet of said first bed and terminating the introduction of air into said first bed;

(b) following the termination of the introduction of air into said first bed and without any intervening steps, cocurrently depressurizing said first bed to remove void space gas and nitrogen from said first bed and passing said void space gas and nitrogen to an outlet of a second bed of said three adsorption beds at lower pressure to countercurrently purge said nitrogen from said second bed;

(c) cocurrently depressurizing said first bed to further remove said void space gas and nitrogen from said first bed and to pressure equalize said first bed with a bed of said three adsorption beds finishing countercurrent purge of step (e);

(d) countercurrently evacuating said first bed under vacuum conditions to further remove said void space gas and nitrogen at a lowest pressure;

(e) countercurrently purging said first bed with cocurrently depressurizing void space gas and nitrogen from a bed of said three adsorption beds undergoing step (b) to remove additional nitrogen from said first bed;

(f) countercurrently pressure equalizing said first bed with a bed of said three adsorption beds at higher pressure undergoing said cocurrent depressurization of step (c);

(g) repressurizing said first bed with oxygen from a bed of said three adsorption beds currently undergoing step (a) and with feed air; and (h) performing steps (a) through (g) in each of said three adsorption beds in a phased sequence.

30. The process of claim 29 wherein a bed undergoing step (g) is repressurized initially with feed air and then with said less strongly adsorbable component.

31. The process of claim 29 wherein a bed undergoing step (g) is additionally repressurized with ambient pressure feed air.

32. The process of claim 29 wherein a bed undergoing step (g) is repressurized initially with ambient pressure feed gas mixture and then with said less strongly adsorbable component.

33. The process of claim 29 wherein a bed undergoing step (g) is repressurized initially with ambient pressure feed air, then with high pressure feed air and finally with oxygen.

34. The process of claim 29 wherein a bed undergoing step (g) is repressurized initially with oxygen and then with feed air.

35. The process of claim 29 wherein a bed undergoing step (g) is repressurized initially with oxygen and then with ambient pressure feed air.

36. The process of claim 29 wherein a bed undergoing step (g) is repressurized initially with oxygen then with ambient pressure feed air and then with high pressure feed air.

37. The process of claim 29 wherein a bed undergoing step (g) is repressurized with oxygen and said feed air simultaneously.

38. The process of claim 29 wherein said feed air is at a pressure in the range of approximately 14–30 psia.

39. The process of claim 29 wherein said feed air is at a pressure in the range of approximately 14–24 psia.

40. The process of claim 29 wherein at the end of evacuation a bed undergoing step (d) is at a pressure in the range of approximately 1–10 psia.

41. The process of claim 29 wherein a bed undergoing step (g) is repressurized with oxygen and ambient pressure feed air simultaneously.

42. The process of claim 29 wherein a bed undergoing step (g) is repressurized with oxygen and high pressure feed air simultaneously.

43. The process of claim 29 wherein during step (c) cocurrent depressurization to pressure equalize with a bed undergoing step (f), simultaneously initiating countercurrent evacuation of said first bed.

44. The process of claim 29 wherein the process is carried out in two beds.

45. The process of claim 29 wherein the process is carried out in at least four beds and at least two beds are simultaneously in a portion of step (a).

* * * * *